UNITED STATES PATENT OFFICE.

WILLIAM ARROUQUIER AND THOMAS BARRETT, OF WORCESTER, MASS.

MORTAR FOR LAYING BRICK, &c.

SPECIFICATION forming part of Letters Patent No. 250,122, dated November 29, 1881.

Application filed October 7, 1881. (No specimens.)

*To all whom it may concern:*

Be it known that we, WILLIAM ARROUQUIER and THOMAS BARRETT, both of the city and county of Worcester and Commonwealth of Massachusetts, have invented certain new and useful Improvements in Mortar for Laying Brick, Stone, &c.; and we do hereby declare that the following is a full, clear, and exact description of the same.

To enable those skilled in the art to which our invention belongs to make and use the same, we will proceed to describe the invention more in detail.

Our improved mortar is made from powdered soapstone, lime-putty, and alum, as follows:

The soapstone is powdered, and the lime-putty is made from burnt lime, with water mixed therewith, to give it the consistency of soft putty, and the alum is also pulverized, and said ingredients are mixed for use for laying brick and stone in the following proportions: First, to every one hundred pounds of powdered soapstone thirty pounds of lime-putty and three pounds of pulverized alum are mixed; and, second, such substances are stirred and mixed together in a suitable receptacle, sufficient water being added during the operation to bring the whole to the consistency of common mortar.

The great advantages of our present invention are the great adhesive power of the mortar when dry, together with the power of resisting the disintegrating effects of heat and exposure to the weather. These properties are especially valuable in the construction of chimneys, as those skilled in the art will readily understand and appreciate.

The mortar can be colored to suit the taste of the user, in the usual manner.

Having described our improvement in mortar, what we claim therein as new and of our invention, and desire to secure by Letters Patent as an improved article of manufacture, is—

A mortar for laying brick and stone, composed of powdered soapstone, lime-putty, and pulverized alum in the proportions substantially as above described.

WILLIAM ARROUQUIER.
THOMAS BARRETT.

Witnesses:
EDWIN E. MOORE,
THOS. H. DODGE.